(12) United States Patent
Boulanger et al.

(10) Patent No.: US 11,126,263 B2
(45) Date of Patent: Sep. 21, 2021

(54) HAPTIC SYSTEM FOR ACTUATING MATERIALS

(71) Applicant: HARMAN INTERNATIONAL INDUSTRIES, INCORPORATED, Stamford, CT (US)

(72) Inventors: Adam Boulanger, Palo Alto, CA (US); Joseph Verbeke, Mountain View, CA (US); Davide Di Censo, Sunnyvale, CA (US); Stefan Marti, Oakland, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 16/319,332

(22) PCT Filed: Jul. 21, 2017

(86) PCT No.: PCT/US2017/043374
§ 371 (c)(1),
(2) Date: Jan. 19, 2019

(87) PCT Pub. No.: WO2018/018003
PCT Pub. Date: Jan. 25, 2018

(65) Prior Publication Data
US 2019/0243450 A1    Aug. 8, 2019

Related U.S. Application Data

(60) Provisional application No. 62/365,960, filed on Jul. 22, 2016.

(51) Int. Cl.
*G09G 1/00* (2006.01)
*G06F 3/01* (2006.01)
(Continued)

(52) U.S. Cl.
CPC .............. *G06F 3/016* (2013.01); *B60K 37/06* (2013.01); *B60Q 9/00* (2013.01); *B60W 50/16* (2013.01);
(Continued)

(58) Field of Classification Search
CPC ......... B60K 37/06; B60Q 9/00; B60W 50/16; B60W 2550/12; B60W 2550/14;
(Continued)

(56) References Cited

U.S. PATENT DOCUMENTS 5,282,858 A    2/1994    Bisch et al.
6,139,488 A    10/2000   Ball
(Continued)

FOREIGN PATENT DOCUMENTS

CN    1646833 A    7/2005
CN    104756173 A    7/2015
(Continued)

OTHER PUBLICATIONS

International Search Report for Application No. PCT/US2017/043374, dated Oct. 6, 2017, 2017, 14 pages.
(Continued)

*Primary Examiner* — Michael A Faragalla
(74) *Attorney, Agent, or Firm* — Artegis Law Group, LLP

(57) ABSTRACT

One embodiment of the present disclosure sets forth a technique for generating an interface on a resonance surface. The technique includes determining a resonance pattern corresponding to a set of interface elements. The technique further includes configuring one or more haptic output devices to generate haptic output that creates the resonance pattern on the resonance surface.

18 Claims, 8 Drawing Sheets

(51) Int. Cl.
*H04R 1/46* (2006.01)
*B60Q 9/00* (2006.01)
*B60W 50/16* (2020.01)
*G06F 9/30* (2018.01)
*B60K 37/06* (2006.01)
*G06F 3/041* (2006.01)
*G06F 3/0488* (2013.01)

(52) U.S. Cl.
CPC .......... *G06F 3/0414* (2013.01); *G06F 3/0488* (2013.01); *G06F 9/3004* (2013.01); *H04R 1/46* (2013.01); *B60W 2552/00* (2020.02); *B60W 2554/00* (2020.02); *B60W 2555/20* (2020.02); *G06F 2203/014* (2013.01); *H04R 2460/13* (2013.01)

(58) Field of Classification Search
CPC .. B60W 2550/20; G06F 3/016; G06F 3/0414; G06F 3/0488; G06F 9/3004; G06F 2203/014; H04R 1/46; H04R 2460/13
See application file for complete search history.

(56) References Cited

U.S. PATENT DOCUMENTS

| | | | |
|---|---|---|---|
| 6,338,028 B1 | 1/2002 | Shelton et al. | |
| 7,560,826 B2 | 7/2009 | Hijikata et al. | |
| 8,547,215 B2 | 10/2013 | Sanma et al. | |
| 8,845,110 B1 | 9/2014 | Worley, III | |
| 8,970,358 B2 | 3/2015 | Kiefer et al. | |
| 9,002,020 B1 | 4/2015 | Kim et al. | |
| 9,081,651 B2 | 7/2015 | Filev et al. | |
| 9,290,174 B1 | 3/2016 | Zagorski | |
| 9,317,119 B2* | 4/2016 | Hirose | G06F 3/016 |
| 9,656,606 B1 | 5/2017 | Vose et al. | |
| 9,718,400 B2 | 8/2017 | Knobl et al. | |
| 9,827,811 B1 | 11/2017 | Mcnew et al. | |
| 9,827,904 B2 | 11/2017 | Modarres et al. | |
| 10,191,537 B2 | 1/2019 | Tanaka et al. | |
| 10,235,848 B2 | 3/2019 | Billington et al. | |
| 10,275,029 B2 | 4/2019 | Jones et al. | |
| 10,282,981 B1 | 5/2019 | Nepomuceno et al. | |
| 10,479,271 B2 | 11/2019 | Hashimoto et al. | |
| 2003/0168838 A1 | 9/2003 | Breed et al. | |
| 2004/0049323 A1 | 3/2004 | Tijerina et al. | |
| 2006/0284839 A1 | 12/2006 | Breed et al. | |
| 2007/0236450 A1 | 10/2007 | Colgate et al. | |
| 2009/0073112 A1 | 3/2009 | Basson et al. | |
| 2009/0076723 A1 | 3/2009 | Moloney | |
| 2009/0250267 A1* | 10/2009 | Heubel | G06F 3/04886 178/18.03 |
| 2009/0259372 A1 | 10/2009 | Hijikata et al. | |
| 2009/0284485 A1 | 11/2009 | Colgate et al. | |
| 2010/0013613 A1 | 1/2010 | Weston | |
| 2010/0085168 A1 | 4/2010 | Kyung et al. | |
| 2010/0198458 A1 | 8/2010 | Buttolo et al. | |
| 2011/0310028 A1 | 12/2011 | Camp, Jr. et al. | |
| 2011/0319703 A1 | 12/2011 | Wiskerke et al. | |
| 2012/0126965 A1 | 5/2012 | Sanma et al. | |
| 2012/0194483 A1 | 8/2012 | Deluca | |
| 2012/0245406 A1 | 9/2012 | Aghamohammadi | |
| 2012/0306631 A1 | 12/2012 | Hughes | |
| 2013/0127755 A1* | 5/2013 | Lynn | G06F 3/0414 345/173 |
| 2013/0155020 A1 | 6/2013 | Heubel | |
| 2013/0222311 A1 | 8/2013 | Pesonen | |
| 2014/0309880 A1 | 10/2014 | Ricci | |
| 2014/0310594 A1 | 10/2014 | Ricci et al. | |
| 2014/0320402 A1 | 10/2014 | Stahlberg | |
| 2014/0346823 A1 | 11/2014 | Stebbins et al. | |
| 2014/0350640 A1 | 11/2014 | Patrick et al. | |
| 2014/0363033 A1 | 12/2014 | Heiman et al. | |
| 2015/0018660 A1 | 1/2015 | Thomson et al. | |
| 2015/0070148 A1 | 3/2015 | Cruz-Hernandez et al. | |
| 2015/0097657 A1 | 4/2015 | Gandhi et al. | |
| 2015/0175172 A1 | 6/2015 | Truong | |
| 2015/0197283 A1 | 7/2015 | Marti et al. | |
| 2015/0199950 A1 | 7/2015 | Heiman et al. | |
| 2015/0268722 A1 | 9/2015 | Wang et al. | |
| 2015/0268726 A1 | 9/2015 | Saboune et al. | |
| 2015/0293592 A1 | 10/2015 | Cheong et al. | |
| 2015/0306312 A1 | 10/2015 | Palerm | |
| 2015/0307105 A1 | 10/2015 | Huber | |
| 2015/0314681 A1 | 11/2015 | Riley, Sr. et al. | |
| 2016/0004309 A1* | 1/2016 | Modarres | G06F 3/016 345/173 |
| 2016/0107570 A1 | 4/2016 | Modarres et al. | |
| 2016/0187979 A1 | 6/2016 | Nahman et al. | |
| 2016/0207454 A1 | 7/2016 | Cuddihy et al. | |
| 2016/0209944 A1 | 7/2016 | Shim et al. | |
| 2016/0217778 A1 | 7/2016 | Iermenko | |
| 2017/0021762 A1 | 1/2017 | Daman | |
| 2017/0090576 A1* | 3/2017 | Peterson | G06F 3/016 |
| 2017/0169673 A1 | 6/2017 | Billington et al. | |
| 2017/0249810 A1 | 8/2017 | Zerick et al. | |
| 2017/0262164 A1 | 9/2017 | Jain et al. | |
| 2017/0336903 A1 | 11/2017 | Rivaud et al. | |
| 2018/0335847 A1 | 11/2018 | Levesque et al. | |
| 2019/0047591 A1 | 2/2019 | Augst | |
| 2019/0122525 A1 | 4/2019 | Lancelle | |

FOREIGN PATENT DOCUMENTS

| | | |
|---|---|---|
| CN | 104816727 A | 8/2015 |
| EP | 1 956 466 A1 | 8/2008 |
| JP | H08-166450 A | 6/1996 |
| JP | 2004-158961 A | 6/2004 |
| JP | 2005-040376 A | 2/2005 |
| JP | 2005-047327 A | 2/2005 |
| JP | 2005-080227 A | 3/2005 |
| JP | 2006-199094 A | 8/2006 |
| JP | 2007-065798 A | 3/2007 |
| JP | 2008-039497 A | 2/2008 |
| JP | 2008-171383 A | 7/2008 |
| JP | 2010-066640 A | 3/2010 |
| JP | 2010-118877 A | 5/2010 |
| JP | 2010-518500 A | 5/2010 |
| JP | 2012-048378 A | 3/2012 |
| JP | 2012-155526 A | 8/2012 |
| JP | 2013-053867 A | 3/2013 |
| JP | 2015-502888 A | 1/2015 |
| JP | 2015-079289 A | 4/2015 |
| JP | 2015-130187 A | 7/2015 |
| JP | 2015-186072 A | 10/2015 |
| JP | 2016-078602 A | 5/2016 |
| KR | 10-2010-0114605 A | 10/2010 |
| WO | 2010/105011 A1 | 9/2010 |
| WO | 2015/086919 A2 | 6/2015 |

OTHER PUBLICATIONS

Extended European Search Report for application No. 17831480.3 dated Nov. 21, 2019, 7 pages.
International Search Report for application No. PCT/US2017/037619 dated Sep. 27, 2017, 7 pages.
Non-Final Rejection received for U.S. Appl. No. 16/319,316, dated Aug. 14, 2019, 20 pages.
Notice of Allowance received for U.S. Appl. No. 16/319,316, dated Dec. 13, 2019, 14 pages.
Extended European Search Report for application No. 17831478.7 dated Nov. 21, 2019, 7 pages.
International Search Report for application No. PCT/US2017/037593 dated Sep. 7, 2017, 7 pages.
Non-Final Rejection received for U.S. Appl. No. 16/319,331, dated Jan. 10, 2020, 24 pages.
Extended European Search Report for application No. 17831936.4 dated Nov. 22, 2019, 7 pages.
International Search Report for application No. PCT/US2017/043238 dated Oct. 2, 2017, 7 pages.
Non-Final Rejection received for U.S. Appl. No. 16/319,319, dated Dec. 27, 2019, 26 pages.

(56) References Cited

OTHER PUBLICATIONS

Extended European Search Report for application No. 17831937.2 dated Nov. 26, 2019, 8 pages.
International Search Report for application No. PCT/US2017/043240 dated Sep. 29, 2017, 9 pages.
Extended European Search Report for application No. 17831989.3 dated Nov. 29, 2019, 8 pages.
Extended European Search Report for application No. 17831938.0 dated Dec. 6, 2019, 7 pages.
International Search Report for application No. PCT/US2017/043242 dated Sep. 29, 2017, 9 pages.
Non-Final Rejection received for U.S. Appl. No. 16/319,330, dated Mar. 4, 2020, 50 pages.
Non-Final Office Action for U.S. Appl. No. 16/319,331 dated Jan. 10, 2020, 18 pages.
Final Office Action for U.S. Appl. No. 16/319,331, dated Jun. 15, 2020, 15 pages.
Yoshino et al., "Tactile Feedback in 2.5 Dimensional Touch Screen", The Proceedings of JSME annual Conference on Robotics and Mechatronics, The Japan Society of Mechanical Engineers, May 24, 2014, pp. 3P2-E07(1)-3P2-E07 (3).

* cited by examiner

■ STRONGER HAPTIC FORCE
▨ MEDIUM II HAPTIC FORCE
▨ MEDIUM I HAPTIC FORCE
▨ WEAKER HAPTIC FORCE
◯ SELECTED TOUCHSCREEN DISPLAY BUTTON

HAPTIC SYSTEM FOR ACTUATING MATERIALS

CROSS-REFERENCE TO RELATED APPLICATIONS

The present application is a national stage application of the international application titled, "HAPTIC SYSTEM FOR ACTUATING MATERIALS," filed on Jul. 21, 2017 and having application number PCT/US2017/043374, which claims priority benefit of the U.S. Provisional Patent Application titled, "VEHICLE INTERFACE SYSTEMS," filed on Jul. 22, 2016 and having Ser. No. 62/365,960. The subject matter of these related applications is hereby incorporated herein by reference.

BACKGROUND

Field of the Embodiments

The various embodiments relate generally to human-machine interfaces and, more specifically, to a haptic system for actuating materials.

Description of the Related Art

Interfaces are implemented pervasively throughout a variety of technology fields, including user experience design, smart device design, peripheral device design, and multi device design. In operation, interfaces facilitate the transfer of information between two or more entities or devices. For example, an input/output interface could moderate the transfer of data and control signals between one or more sensors and one or more processing units. In addition, an interface may moderate the transfer of information between a user and computer or machine. Such interfaces are termed human-machine interfaces.

Conventionally, human-machine interfaces include various types of output elements for delivering information to a user, including, visual displays, heads-up displays, audio alerts, and so forth. Human-machine interfaces may also include various types of input elements, such as buttons, sliders, steering wheels, and touchscreens. Typically, a user receives a notification via one or more output elements. The user could then respond to the notification by adjusting the position of one or more input elements. For example, an audio alert could be generated when a navigation device turns on. The user could then manually enter a destination on a virtual keyboard displayed on a touchscreen that is included in the navigation device.

One drawback of these types of conventional interfaces is their limited configurability. In particular, conventional interfaces are limited by the available types of output and input elements built into the device. For example, a navigation device may include a touchscreen as an input element, but may not include a physical keyboard as an input element. A user may prefer using a physical keyboard during certain times of the day and may prefer using a virtual keyboard during other times of day. Conventional types of interfaces do not include both physical and virtual interfaces. Further, including both touchscreens and physical keyboard layouts in small devices may increase the size of these types of devices. In particular, adding additional input elements and output elements into size constrained devices may result in these types of devices exceeding their maximum size limitation. Furthermore, including redundant types of interface elements in a single device may also increase the cost of producing such devices.

As the foregoing illustrates, techniques for more effectively designing interfaces would be useful.

SUMMARY

Embodiments of the present disclosure set forth a method for generating an interface on a resonance surface. The method includes determining a resonance pattern corresponding to a set of interface elements. The method further includes configuring one or more haptic output devices to generate haptic output that creates the resonance pattern on the resonance surface.

Further embodiments provide, among other things, a system and a non-transitory computer-readable storage medium configured to implement the techniques set forth above.

At least one advantage of the techniques described herein is that a user can interact with an interface without requiring the user to look towards the target. Accordingly, a user (e.g., a driver) is able to interact with an interface and select options in a menu without diverting his or her gaze from the road. Furthermore, resonance surfaces can be an alternative means for communicating with the user, preventing the user's visual and auditory senses from being overwhelmed with additional information.

BRIEF DESCRIPTION OF THE SEVERAL VIEWS OF THE DRAWINGS

So that the manner in which the recited features of the one or more embodiments set forth above can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the various embodiments subsumes other embodiments as well.

DETAILED DESCRIPTION

Figure 1:
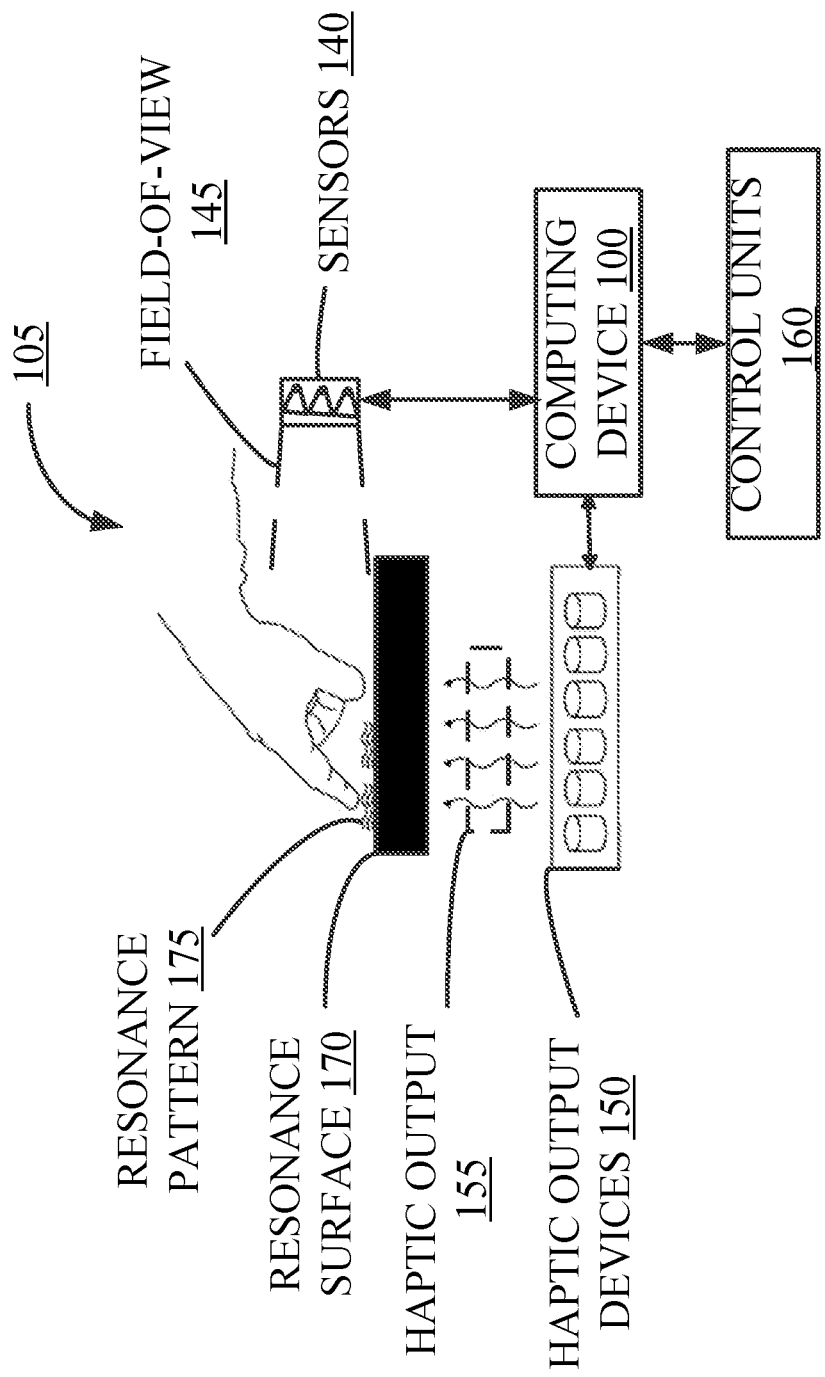
FIG. 1 illustrates a system environment for actuating a material to generate an interface via haptic output, according to various embodiments.

FIG. 1 illustrates a system environment for actuating a material to generate an interface via haptic output, according to various embodiments. As shown, system environment 105 includes computing device 100, control units 160, and sensors 140 field-of-view 145. In addition, system environment 105 includes haptic output devices 150 that generate haptic output 155, resonance surface 170, and resonance pattern 175 on the resonance surface 170.

Resonance surface 170 includes any type of material and/or medium that changes shape or structure when a wave interacts with resonance surface 170. Resonance surface 170 includes a rubber, a gel, a liquid, and a semi-viscous material, and so forth. Resonance surfaces 170 may have a variety of shapes and sizes. For example, resonance surfaces 170 could be flat, curved, large, small, rectangular, circular, elliptical, freeform, and so forth. In addition, resonance surface 170 may be soft and/or bendable, such as foam-like surfaces and gel-like surfaces. When a haptic output 155 interacts with resonance surface 170, one or more physical and/or chemical properties of resonance surface 170 change. Such changes cause resonance surface 170 to change shape and/or texture. Such an alteration to the shape and/or texture resonance surface 170 is referred to herein as resonance pattern 175.

In some embodiments, when haptic output 155 interacts with resonance surface 170, various physical properties of the resonance surface 170 change, including the state and/or temperature of resonance surface 170. Changing the physical properties of resonance surface 170 causes the shape and/or texture of resonance surface 170 to change, thereby producing resonance pattern 175. For example, when haptic output interacts with resonance surface 170, resonance surface 170 could displace laterally, displace vertically, vibrate, and so forth. Such changes may occur globally throughout resonance surface 170 or could occur locally in resonance surface 170. For example, resonance surface 170 could deform locally when haptic output only interacts with a section of resonance surface 170.

In one embodiment, haptic output interacts with resonance surface 170 by exerting a shearing force on resonance surface 170. Shearing forces cause resonance surface 170 to change shape and/or texture at the location of the interaction between the haptic output and resonance surface 170, thereby generating resonance surface 175. For example, haptic output could exert a shearing force that alternates in direction on resonance surface 170. Such a shearing force causes surface 170 to resonate, thereby generating resonance pattern 175.

In various embodiments, resonance pattern 175 may be small. For example, resonance pattern 175 could be approximately 1 millimeter in diameter. In another embodiment, resonance pattern 175 may be medium-sized. For example, resonance pattern 175 could be approximately 1 centimeter in diameter. In other embodiments, resonance pattern 175 could be large. For example, resonance pattern 175 could be approximately 10 centimeters in diameter. In various embodiments, resonance surface 170 could include regions that include resonance pattern 175 of different sizes. For example, resonance surface 170 may include one region in which resonance pattern 175 is between 0.5-5 centimeters in diameter and another region where resonance pattern 175 is between 5-15 centimeters in diameter.

Resonance surface 170 could also include a third region in which resonance pattern 175 is between 0.5-5 millimeters in diameter. Furthermore, resonance pattern 175 may include regions in which resonance pattern 175 is packed at various densities. For example, resonance pattern 175 could include regions that are densely packed, regions that are moderately packed, and regions that are loosely packed. In one embodiment, resonance pattern 175 may be closely spaced and be of a small diameter (e.g., 0.5-5 millimeters in diameter). Such resonance pattern 175 may simulate a rough surface. In another embodiment, resonance pattern 175 may be loosely spaced and of a medium diameter (e.g., 0.5-5 centimeters in diameter). Such resonance pattern 175 may resemble a keyboard type interface. In another region, resonance pattern 175 may be of a large diameter (e.g., 5-15 centimeters in diameter).

In addition, resonance surface 170 may include composite materials. Composite materials are materials formed by embedding one or more resonance surfaces 170 into a non-resonance surface. In such embodiments, when haptic output interacts with the composite surface, resonance pattern 175 is generated in the sections of the composite materials containing resonance surface sections. Implementing such composite surfaces may generate complex resonance patterns 175 on resonance surface 170.

Haptic output devices 150 include any type of device that is capable of generating haptic output that can cause resonance surface 170 to change shape and/or texture. For example, haptic output devices 150 could include ultrasonic transducers. Ultrasonic transducers generate haptic output in the form of ultrasonic waves. In various embodiments, haptic output devices 150 receive one or more control signals from computing device 100 that indicate how one or more parameters of haptic output devices 150 should be configured. These parameters include the intensity and phase of haptic output 155. Based on the control signal(s), haptic output devices 150 generate haptic output 155 that causes resonance surface 170 to generate a particular type of resonance pattern 175. For example, haptic output devices 150 could generate haptic output 155 with a certain frequency, phase, intensity, etc. That particular haptic output 155 could cause resonance surface 170 to resonate, thereby generating a particular resonance pattern 175 that has a particular shape and size. The particular resonance pattern 175 could be in the form of an interface.

As shown haptic output devices 150 are arranged in a linear manner, however other arrangements of haptic output devices 150 are within the inventive concept. For example, haptic output devices 150 could be arranged as an array, in a circular or elliptical manner, or may be randomly placed about resonance surface 170. Regardless of the arrangement of haptic output devices 150, haptic output 155 may cause resonance surface 170 to resonate in a manner that generates resonance patterns 175 with various shapes and sizes. For example, haptic output devices 150 arranged in a 5×5 array may generate haptic output 155 that causes resonance surface 170 to generate resonance pattern 175 with a circular, elliptical, freeform, rectangular, and/or any other type of shape. As shown, haptic output devices 150 are arranged below resonance surface 170, however, haptic output devices 150 can be located at various positions around and distances away from resonance surface 170. For example, haptic output devices 150 could be located above resonance surface 170, could be located at various angles to resonance surface 170, and so forth.

Sensors 140 generate interaction data that indicates how the user interacted with resonance surface 170. For example, the user could touch a particular area of resonance surface 170. Sensors 140 could generate interaction data that indicates the area of resonance surface 170 that the user touched.

Sensors 140 may also generate interaction data that further indicates one or more characteristics of how the user interacted with resonance surface 170. For example, sensors 140 could indicate whether the user used one finger or two fingers to touch and/or swipe resonance surface 170. Sensors 140 may also generate interaction data that reflects whether the user executed a gesture on resonance surface 170. Sensors 140 transmit the interaction data to computing device 100. Sensors 140 may transmit the interaction data via a controller area network, a local interconnect network, a FlexRay®, and so forth.

Sensors 140 may include imaging sensors, acoustic sensors, and hybrid mechanical/resonance sensors. Imaging sensors include visual sensors (e.g., an RGB image sensor), infrared sensors, time-of-flight sensors (e.g., depth cameras), thermal sensors, radar based sensors (e.g., short range and long range sensors), laser based sensors (e.g., LIDAR), ultrasound based sensors, microwave based sensors, driver facing cameras, and so forth. Imaging sensors may be located at any position around resonance surface 170 that allow sensors 140 to image the part of resonance surface 170 with which the user interacts. Acoustic sensors may include contact microphones and other types of sensors that can detect the sound emitted by the interaction of a user's hand with resonance surface 170. In addition, sensors 140 may include hybrid mechanical/resonance sensors that are embedded into resonance surface 170. Such sensors detect the pressure of a user's hand and/or finger touching and/or swiping resonance surface 170. Such sensors may include capacitive sensors, piezoelectric sensors, and so forth. In addition, sensors, capacitive elements, and/or piezoelectric materials may be in embedded into resonance surface 170. These types of sensors may release electrical energy and/or electrical signals when the user touches resonance surface 170. A secondary sensor 140 may detect the released electrical energy and/or electrical signals and may generate interaction data. The interaction data may include the area of resonance surface 170 with which the user interacted and the manner in which the user interacted with resonance surface 170 (e.g., swipe, touch, etc.).

Control units 160 may include an in-vehicle infotainment system, a driver assistance system, and so forth. In various embodiments, control units 160 determine one or more interfaces to deliver to the user via resonance surface 170. Control units 160 transmit control signals to computing device 100 that indicate a particular type of interface to simulate on resonance surface 170. For example, control units 160 could generate control signals that indicate that a keypad interface, a keyboard interface, a multilevel menu, etc. should be simulated on resonance surface 170. In addition, control units 160 receive interface data from computing device 100 that indicates an interface control that the user selected on the interface. For example, the interface data could indicate that the user selected the letter "k" on a keyboard interface simulated by resonance surface 170.

Computing device 100 may be a microprocessor, an application-specific integrated circuit (ASIC), a system-on-a-chip (SoC), and so forth. As shown, computing device 100 may be independent of control units 160. In alternative embodiments, computing device 100 may be embedded in control units 160 and/or may share one or more processing units, I/O interfaces, and/or surface memory devices (e.g., a database) with control units 160. As noted above, in various embodiments, computing device 100 receives feedback data from haptic output devices 150, interaction data from sensors 140, and control signals from control units 160. Furthermore, computing device 100 generates and transmits control signals to configure haptic output devices 150 to generate a particular type of haptic output 155. In addition, computing device 100 processes interaction data from sensors 140 to generate interface data that indicates an interface control that the user selected. Computing device 100 transmits interface data to control units 160. In some embodiments, computing device 100 generates control signals to activate one or more of sensors 140 and/or initiates data transfer from sensors 140. Computing device 100 processes interaction data from sensors 140 to generate interface data that includes the type of user interaction, such as an input event, that occurred between the user and resonance surface 170. Computing device 100 transmits the interface data to control units 160.

Figure 2:
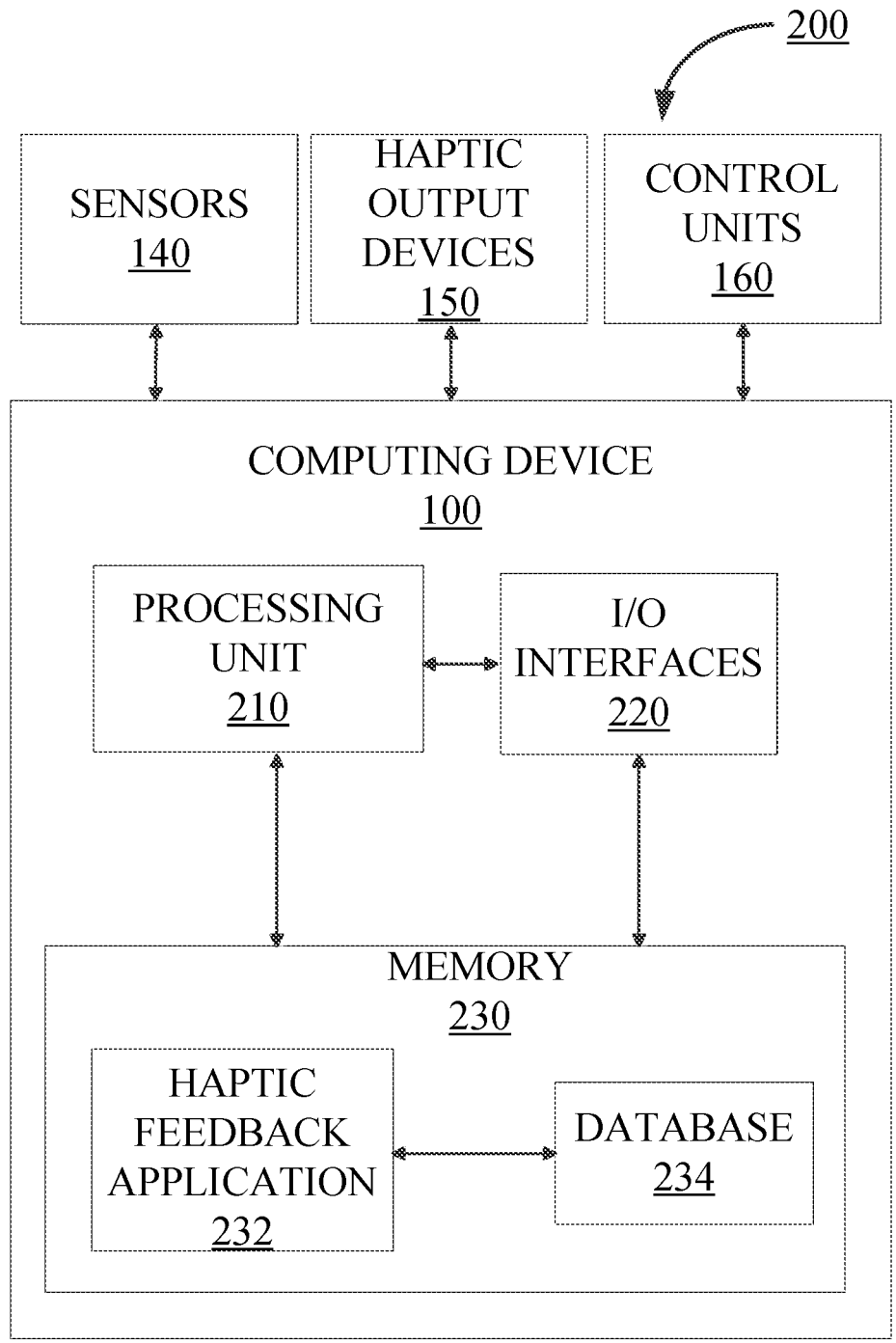
FIG. 2 illustrates a block diagram of a computing device configured to implement one or more aspects of the present disclosure, according to various embodiments.

FIG. 2 illustrates a block diagram of a computing device 100 configured to implement one or more aspects of the present disclosure, according to various embodiments. As shown, system environment 200 includes a computing device 100, sensors 140, haptic output devices 150, and control units 160. In operation, computing device 100 configures haptic output devices 150 to generate haptic output 155 on resonance surface 170. Haptic output 155 generates a resonance pattern 175 on resonance surface 170 with which a user can interact. Sensors 140 generate data indicative of the user's interaction with resonance surface 170 and transmit the interaction data to computing device 100. Computing device 100 analyzes the interaction data to determine one or more characteristics of how the user interacted with resonance surface 170. Computing device 100 generates interface data that indicates an interface control that the user selected based on the interaction data and transmits the interface data to control unit 160.

Input/output (I/O) interfaces 120 may include one or more interfaces that coordinate the transfer of data, control signals, and notifications between sensors 140, haptic output devices 150, control units 160, and processing unit 210. I/O interfaces 220 coordinates the receipt of interaction data from sensors 140 and the transmission of interface data to control units 160. I/O interfaces 220 may transmit and/or receive various types of data via a controller area network, a local interconnect network, a FlexRay®, and so forth.

Processing unit 210 may include a central processing unit (CPU), digital signal processing unit (DSP), a sensor processing unit, a controller unit, and so forth. Processing unit 210 may be physically embedded into computing device 100, may be part of a cloud-based computing environment, and/or may be physically introduced into computing device 100 by a user, such as in a mobile or wearable device. In some embodiments, processing unit 210 may be an element of control units 160, such as a microprocessor within an in-vehicle infotainment system or a driver assistance system. In various embodiments, processing unit 210 is configured to execute applications included in memory 230.

Memory 230 includes haptic feedback application 232 configured to communicate with database 234. Processing unit 210 executes haptic feedback application 232 to implement the overall functionality of computing device 100. In a manner that is similar to processing unit 210, memory device 130 may be embedded in control units 160 or introduced into computing device 100 by a user. Moreover, memory 230 may be included in a cloud-based computing environment.

Database 234 may store various types of data including, user preferences data (e.g., a type of haptic sensation that the user prefers), various pre-set configurations for one or more of sensors 140 and haptic output devices 150, configurations set by the user, and so forth. For example, database 234 could store a user configuration for resonance surface 170 that identifies various types of resonance patterns 175 to generate on resonance surface 170. Database 234 may also store look-up tables, algorithms, etc. for analyzing interaction data in order to identify various ways to configure haptic output devices 150 to generate a particular type of haptic output 155 that causes the resonance surface 170 to resonate, thereby generating a particular type of resonance pattern 175 on resonance surface 170. Database 234 may also store look-up tables and algorithms for analyzing interaction data indicative of a user's interaction with resonance pattern 175 and for generating interface data for transmission to control units 160.

Haptic feedback application 232 receives control signals from control units 160 via I/O interfaces 220. Haptic feedback application 232 analyzes the control signals to determine a type of resonance pattern 175 to generate on resonance surface 170. Haptic feedback application 232 may access data from database 234 when determining the type of resonance pattern 175 to generate on resonance surface 170. For instance, haptic feedback application 232 could access a look-up table in database 234 to determine a type of menu to simulate on resonance surface 170 in response to receiving one or more control signals from control units 160. Haptic feedback application 232 could further determine a type of resonance pattern 175 to generate on resonance surface 170 that simulates the selected type of menu.

Haptic feedback application 232 configures haptic output devices 150 to generate haptic output 155 that causes resonance surface 170 to generate resonance pattern 175. Haptic feedback application 232 determines various parameters of haptic output 155, including the frequency, intensity, and phase of the haptic output from each haptic output device 150. In addition, haptic feedback application 232 determines one or more locations on resonance surface 170 to which hotspots from haptic output 155 should be directed. Hotspots are locations where haptic output 150 from one or more haptic output devices interferes constructively, thereby generating a higher intensity of haptic output 155 at that location that at other locations that also receive haptic output 155. Furthermore, haptic feedback application 232 configures haptic output devices 150 to generate hotspots on particular locations of resonance surface 170 in order to generate the specified type of haptic pattern 175 on resonance surface 170.

In particular, haptic feedback application 232 may configure haptic output devices 150 to generate haptic output 155 that generates resonance pattern 175 on resonance surface 170 with various sizes. For example, haptic output 155 could generate resonance pattern 175 with one or more regions of large diameter (e.g., 5-15 centimeters in diameter), medium diameter (e.g., 0.5-5 millimeters in diameter), and/or small diameter (e.g., 0.5-5 millimeters in diameter). In addition, haptic feedback application 232 may configure haptic output devices 150 to generate haptic output 155 that generates resonance pattern 175 that is densely packed, moderately packed, or loosely packed within a particular region.

Haptic feedback application 232 may access database 234 to determine the frequency or frequencies of haptic output 155 that causes resonance surface 170 to resonate, thereby generating a resonance pattern 175. Furthermore, haptic feedback application 232 may access database 234 to determine if various parts of resonance surface 170 are triggered by different frequencies. In addition, haptic feedback application 232 may access database 234 to determine the location, orientation, frequency range, and intensity range of haptic output devices 150. Haptic feedback application 232 may use such data to configure haptic output devices 150 to generate haptic output 155 that causes resonance surface 170 to generate resonance pattern 175.

As stated above, haptic feedback application 232 receives the position, orientation, and type of haptic output devices 150 from database 234. In various embodiments, haptic output devices 150 may include ultrasonic transducers. Ultrasonic transducers may be arranged in arrays (e.g., 4-by-4, 8-by-8, 16-by-16, etc.). Each ultrasonic transducer emits ultrasonic waves of a certain frequency, phase, and intensity. Haptic feedback application 232 configures the ultrasonic transducers in a manner such that haptic output generated by two or more ultrasonic transducers occupy a particular location in space at a particular time. When this occurs, the haptic output of each ultrasonic transducer interferes constructively and/or destructively with the haptic output of one or more other ultrasonic transducers. Haptic feedback application 232 configures ultrasonic transducers such that the constructive and/or destructive interference occurs at the locations at which the haptic output interacts with resonance surface 170, thereby causing resonance surface 170 to resonate in a particular manner. By modifying the intensity, phase, and frequency of the haptic output of each ultrasonic transducer, haptic feedback application 232 shifts the location of intensity peaks of haptic output, increases or decreases the number of intensity peaks of haptic output, and/or adjusts the shape and/or magnitude of one or more intensity peaks of haptic output. In this manner, haptic feedback application 232 configures ultrasonic transducers and/or haptic output devices 150 in general to cause resonance surface 170 to resonate in a particular manner, thereby generating a particular type of resonance pattern 175.

In one embodiment, haptic feedback application 232 configures haptic output devices 150 to generate haptic output 155 that generates resonance pattern 175 on resonance surface 170, in response to receiving one or more control signals from control unit 160. In another embodiment, when haptic feedback application 232 configures haptic output devices 150 to generate haptic output 155, haptic feedback application 232 also configures sensors 140 to generate interaction data that indicates whether any part of the user is proximate to resonance surface 170 and/or if the user has interacted with resonance surface 170. For instance, visual sensors could image the area proximate to resonance surface 170 and generate interaction data that indicates whether the user has touched resonance surface 170. In addition or alternatively, contact sensors are embedded in resonance surface 170 and generate interaction data that indicates whether the user touched resonance surface 170.

Haptic feedback application 232 receives interaction data from sensors 140 and processes the interaction data to determine one or more interaction parameters of the manner in which the user interacted with resonance surface 170. Interaction parameters may include the position of the hand relative to the position of resonance pattern 175, whether the hand touched resonance surface 170 and/or resonance pattern 175, various types of user interactions, such as how the user touched resonance surface 170, including a quick touch, a one or two finger swipe, a prolonged touch, a double touch, and so forth. In some embodiments, haptic feedback application 232 may analyze interaction data to determine if the user executed a particular gesture over a part of resonance surface 170 and/or resonance pattern 175. Such a gesture may indicate that haptic feedback application 232 should modify the type of resonance pattern 175 generated and/or the intensity of haptic output 155 that generates resonance pattern 175.

Haptic feedback application 232 may access data in database 234 when analyzing interaction data. For example, haptic feedback application 232 could access look-up tables in database 234 to associate one or more types of user interactions with one or more types of input events. Such input events could include selecting a button, inputting information into an input field, and so forth. Haptic feedback application 232 associates the user interaction with a particular part of resonance surface 170 in order to associate the user interaction with a particular interface control associated with the interface (e.g., a slider or a button) being simulated by resonance pattern 175.

Haptic feedback application 232 generates interface data based on the interaction data. Haptic feedback application 232 transmits the interface data to control units 160 via I/O interfaces 220. In one embodiment, haptic feedback application 232 accesses a look-up table in database 234 to associate a particular type of user interaction on a particular part of resonance surface 170 with a particular input event. For example, haptic feedback application 232 could associate the user touching a resonance pattern 175 on resonance surface 170 with the input event of a user selecting the letter "r" on a keyboard interface. Haptic feedback application 232 includes the input event in the interface data and transmits the interface data to control units 160. In another embodiment, haptic feedback application 232 includes the type of the user interaction and the location of the user interaction with respect to resonance surface 170 and/or resonance pattern 175 in the interface data. Haptic feedback application 232 transmits the interface data to control units 160.

Various embodiments disclosed herein are described as being implemented in a vehicle environment (e.g., vehicular environment 100). In general, the vehicle may include any type of transportation device, including, without limitation, a car, a truck, a motorbike, a boat, a submarine, a personal watercraft, a snow mobile, an airplane, a space craft, and so forth. The embodiments disclosed herein contemplate any technically feasible system configured to implement the functionality of the haptic output devices within any type of environment. For example, and without limitation, the techniques described herein could be implemented with a remote vehicle control system, such as a system that controls an automobile or a drone. In particular, resonance surface 170 may be included in a variety of locations in a vehicle. For example, resonance surface 170 could be included in an arm rest, a dash board, an area around a center console display, the knob of a gear shift, as well as in various parts of a steering wheel, including the rim and the center of the steering wheel.

Additionally, although various techniques are described as being performed on the hand of a user, any of the techniques disclosed herein can be used to generate haptic output on any part of a user, including the user's hands, arms, feet, ankles, fingers, finger tips, and so forth. Further, although certain techniques are described as being performed by certain types of haptic output devices (e.g., ultrasonic transducers), each technique disclosed herein may implement any type of haptic output device that is able to cause resonance surface 170 to generate resonance pattern 175. In particular, haptic output devices that generate resonance pattern 175 without making direct, physical contact with resonance surface 170 can be implemented in any embodiment disclosed herein.

Figure 3:
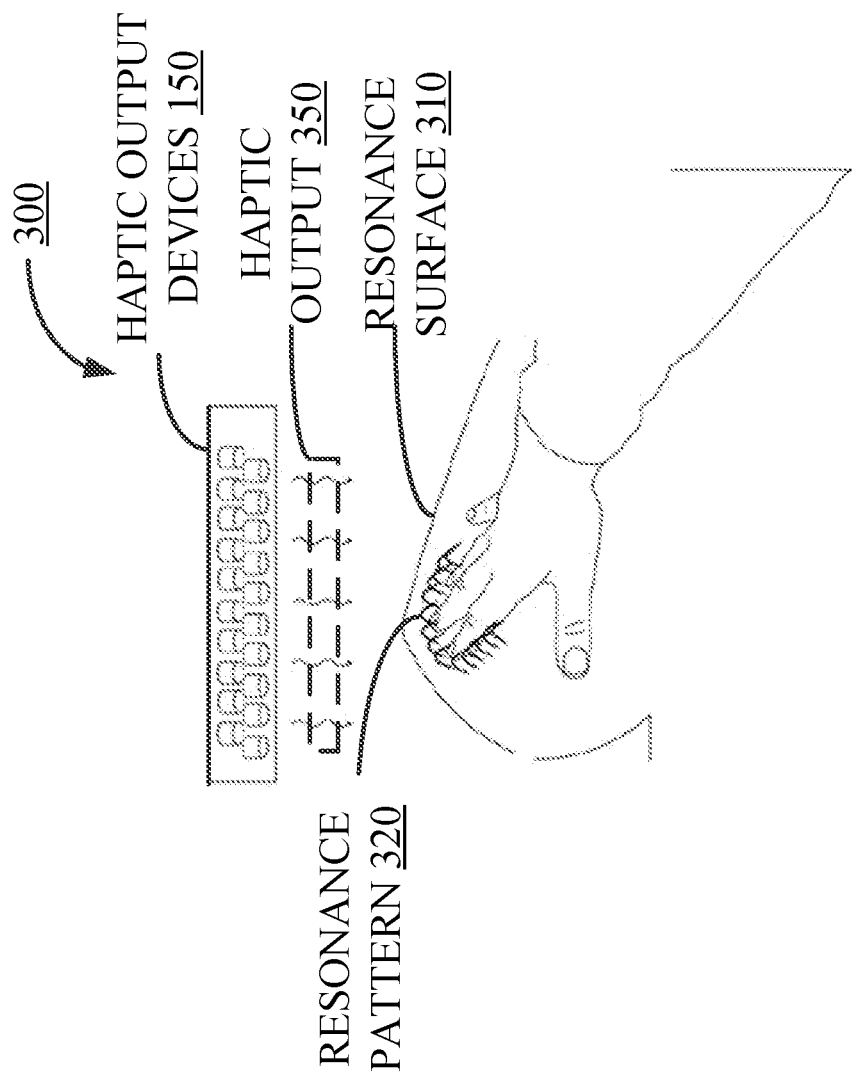
FIG. 3 illustrates a second system configuration for implementing various embodiments of the present disclosure.

FIG. 3 illustrates a second system configuration to implement various embodiments of the present disclosure. As shown, haptic output 350 causes resonance surface 310 to resonate, thereby generating resonance pattern 320. In addition, haptic output devices 150 generate haptic output 350. As shown, the user's hand occludes haptic output 350 from interacting with the parts of resonance surface 310 that lie under the user's hand. In various embodiments, haptic output 350 may only be able to interact with the parts of the resonance surface 310 that surrounds the user's hand and/or body. However, the parts of the resonance surface 310 that lie under the user's hand are connected with the parts of resonance surface 310 that lie around the user's hand. Thus, when haptic output 350 causes the parts of resonance surface 310 that surrounds the user's hand to resonate, the parts of resonance surface 310 that lie under the user's hand also resonate. Although the hand may have a dampening effect on resonance pattern 320, a resonance pattern 320 is still generated under the user's hand.

Because of this effect, haptic output devices 150 can be located at any position with respect to resonance surface 310, even if haptic output 350 may be partially occluded by the user's body. For example, haptic output devices 150 can be located to the side of resonance surface 310, above resonance surface 310, below resonance surface 310, and so forth. The location of the user's body does not inhibit haptic output 350 from generating a resonance pattern 320 on resonance surface 310.

Figure 4:
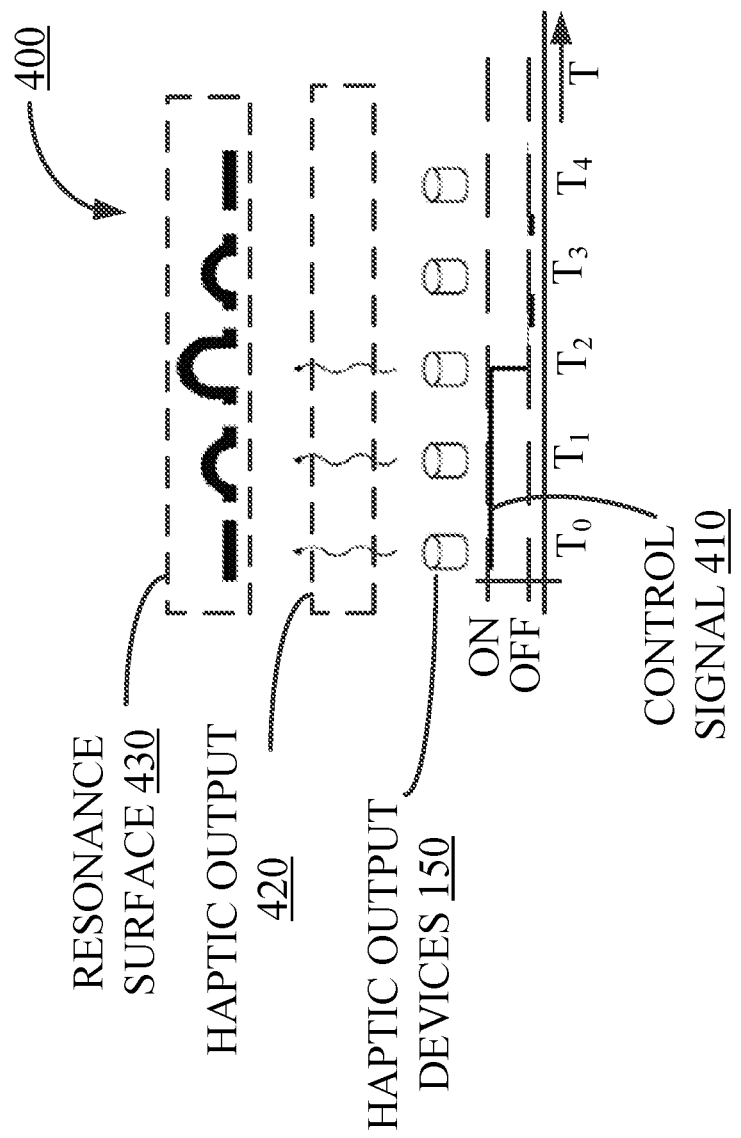
FIG. 4 illustrates a technique in which haptic feedback application implements surface memory when generating resonance patterns on resonance surfaces, according to various embodiments.

FIG. 4 illustrates a technique for implementing surface memory when generating resonance patterns on resonance surface 430, according to various embodiments. As shown, haptic feedback application 232 generates control signal 410 that configures haptic output devices 150 to generate haptic output 420. Haptic output 420 causes the resonance surface 430 to resonate, thereby generating a resonance pattern. At time $t_0$, haptic feedback application 232 generates control signal 410 that configures haptic output devices 150 to generate haptic output 150. As shown, the control signal 410 is in the "on" position, which corresponds to haptic output devices 150 generating haptic output 420. Haptic output 420 causes resonance surface 430 to resonate. As resonance surface 430 resonates, the shape of resonance surface 430 changes. As shown, at time $t_1$, resonance surface 430 assumes a crescent shape. At time $t_2$, the crescent shape is more pronounced. At time $t_2$, haptic feedback application 232 configures haptic output devices 150 to cease generating haptic output 420. As shown at $t_2$, the control signal 410 is in the "off" position, and haptic output devices 150 stop generating haptic output 420. Although haptic output devices 150 are not generating haptic output 420, resonance surface 430 continues to resonate. As shown, at time $t_3$, resonance surface 430 continues to assume a crescent shape, which indicates that resonance surface 430 is still resonating. However, after haptic output devices 150 stop generating haptic output 150 for a long enough period of time, the resonance of resonance surface 430 is minimal. As shown, at time $t_4$, resonance surface 430 assumes a flat shape, which indicates that resonance surface 430 no longer resonates in response to haptic output 420.

The tendency for resonance surface 430 to resonate after haptic output devices 150 no longer generate haptic output 420 is defined as surface memory. Haptic feedback application 232 utilizes surface memory when configuring haptic output devices 150 to generate haptic output 420 that generates a resonance pattern on resonance surface 430. In various embodiments, the user can feel the resonance pattern 175 on resonance surface 430 after haptic output devices 150 no longer generate haptic output 420. Surface memory may facilitate a user in reminding himself or herself about options available on an interface for a given period of time after a user interaction.

Figure 5:
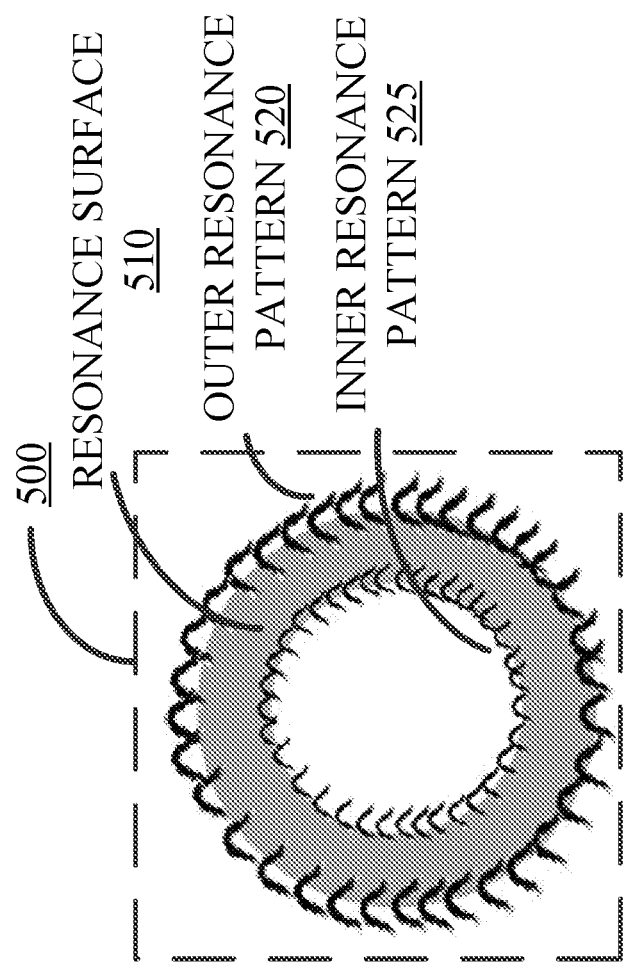
FIG. 5 illustrates a complex resonance pattern generated on a resonance surface via haptic output, according to various embodiments.

FIG. 5 illustrates a complex resonance pattern that haptic feedback application 232 configures haptic output devices 150 to generate on resonance surface 510 via haptic output 155, according to various embodiments. As described above, haptic feedback application 232 configures haptic output devices 150 to generate haptic output 155 that interacts with resonance surface 510, generating resonance patterns. As shown, outer resonance pattern 520 and inner resonance pattern 525 are generated on resonance surface 510.

As described above, haptic feedback application 232 determines where hotspots from haptic output 155 should interact with resonance surface 510. In this manner, haptic feedback application 232 controls the types of resonance patterns produced by resonance surface 510. In system environment 500, haptic feedback application 232 configures haptic output devices 150 to generate haptic output 155 that describes the circumference of two concentric circles with differing radii on resonant surface 510. Haptic output 155 generates an outer resonance pattern 520 and an inner resonance pattern 525 on resonance surface 510.

In various embodiments, haptic feedback application 232 configures haptic output devices 150 to generate haptic output 155 that causes the one section of resonance surface 510 to exhibit a larger deformation than a second section. As shown in system environment 500, haptic feedback application 232 configures haptic output devices 150 to generate haptic output 155 that causes resonance surface 510 to resonate in a manner, such that the outer resonance pattern 520 is larger than the inner resonance pattern 525. Such a resonance pattern may assist a user in distinguishing between the outer edge and the inner edge of resonance surface 510.

Figure 6B:
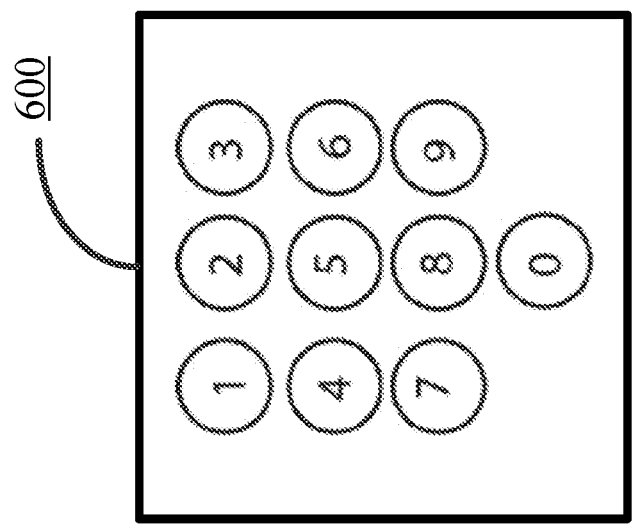
FIG. 6B illustrates a traditional keypad interface, according to various embodiments.
Figure 6A:
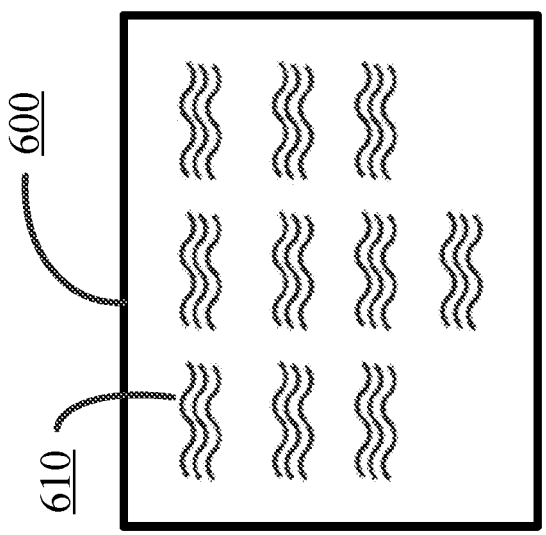
FIG. 6A illustrates a keypad interface simulated by resonance patterns on a resonance surface.

FIG. 6A illustrates a keypad interface simulated by resonance patterns on a resonance surface and FIG. 6B illustrates a traditional keypad interface, according to various embodiments. As described above, haptic feedback application 232 receives control signals from control units 160 that indicate a type of interface to generate on resonance surface 600. Haptic feedback application 232 configures haptic output devices 150 to generate haptic output 155 that causes resonance surface 600 to resonate. In various embodiments, resonance surface 600 is a composite surface that contains segments that resonate when haptic output 155 of a particular frequency interacts with resonance surface 600, but does not resonate when haptic output 155 of another frequency interacts with resonance surface 600. As described above, composite surfaces can facilitate haptic feedback application 232 in generating complex resonance patterns 610 that simulate various types of interfaces.

In one embodiment, haptic feedback application 232 configures haptic output devices 150 to generate haptic output 155. Haptic output 155 generates hotspots on resonance surface 600 that causes resonance surface 600 to resonate in a manner that generates resonance pattern 610. Resonance pattern 610 resembles a traditional keypad interface depicted in FIG. 6B.

In another embodiment, resonance surface 600 is a composite surface. In composite surfaces, resonance surface materials are interspersed with non-resonance surface materials. In one embodiment, haptic feedback application 232 configures haptic output devices 150 to generate haptic output 155 on resonance surface 600. When haptic output 155 interacts with resonance surface 600, only the resonance surface materials in the composite surface resonate. In FIG. 6B, the resonance surface materials are arranged in a manner such that resonance surface 600 generates resonance patterns 610 that resemble a keypad interface.

In other embodiments, resonance surface 600 contains only resonance surface materials. In such embodiments, haptic feedback application 232 configures haptic output devices 150 to generate haptic output 155 with hotspots that target specific locations in resonance surface 600. These locations correspond to the locations of resonance pattern 610.

As described above, one or more sensors 140 may be located around resonance surface 600 and/or embedded within resonance surface 600. When the user interacts with the resonance surface (e.g., by touching a region of resonance surface 600 corresponding to the number 4), sensors 140 generate interaction data and transmit that interaction data to haptic feedback application 232. Haptic feedback application 232 analyzes the interaction data to determine the type of user interaction and the location of the user interaction. For example, haptic feedback application 232 could determine that the user touched an area of resonance surface 600 corresponding to the number "4", where selecting the number "4" is an input event. Haptic feedback application 232 generates interface data that reflects that input event and transmits the interface data to control units 160.

Figure 7:
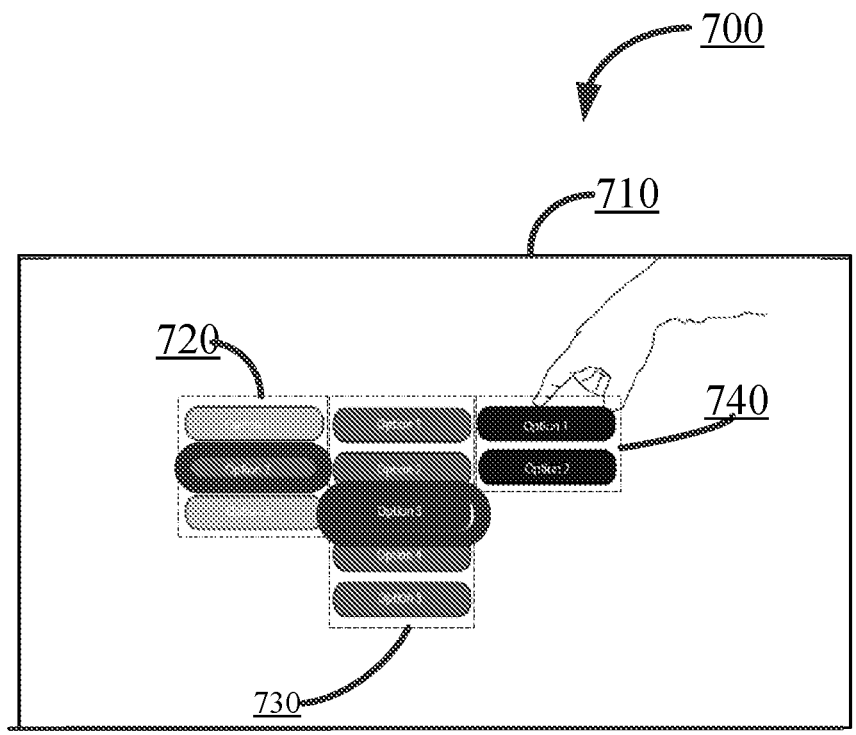
FIG. 7 illustrates a resonance pattern generated on a resonance surface that resembles a multilevel menu that is responsive to user input, according to various embodiments.

FIG. 7 illustrates a resonance pattern generated on resonance surface 700 that resembles a multilevel menu that is responsive to user input, according to various embodiments. As shown, system environment 700 includes resonance surface 710, resonance patterns 720, 730, and 740. Resonance pattern 720 resembles a main menu, resonance pattern 730 resembles a submenu level I, and resonance pattern 740 resembles a submenu level II.

Haptic feedback application 232 configures haptic output devices 150 to generate haptic output 155 that causes resonance surface 700 to resonate. The surface resonance generates main menu resonance pattern 720 on resonance surface 710. Sensors 140 generate interaction data indicative of the user's hand position with respect to main menu resonance pattern 720. When the user selects an option in main menu resonance pattern 720, haptic feedback application 232 receives interaction data reflective of the input event. Haptic feedback application 232 analyzes the interaction data to determine that the menu option that the user selected. Haptic feedback application 232 transmits the user's selection as interface data to control units 160. Control units 160 transmit control signals to haptic feedback application 232 that indicate the type of submenu to simulate via a resonance pattern.

Similar to the main menu, haptic feedback application 232 configures haptic output devices 150 to generate haptic output 155 to cause resonance surface 700 to resonate, thereby generating submenu level I resonance pattern 730. Again, sensors 140 generate interaction data that indicate a user's hand position. Haptic feedback application 232 analyzes the user's hand position to determine a menu option that the user selected, generates interface data indicative of the user's selection, and transmits the interface data to control units 160. The process continues through subsequent menu levels.

In some embodiments, as the user progresses through the levels of a multilayer menu, haptic feedback application 232 configures haptic output devices 150 to generate haptic output 155, which varies in intensity at various parts of the resonance surface 710. For example, haptic feedback application 232 could configure haptic output devices 150 to generate haptic output 155, such that haptic output 155 that generates the main menu resonance pattern 710 has a smaller resonance pattern than haptic output 155 that generates the submenu level II resonance pattern 740. Such techniques can assist a user in distinguishing between two or more layers of a multilayer haptic interface. In addition, haptic feedback application 232 could configure haptic output devices 150 to generate haptic output 155, such that the resonance pattern associated with the menu option that the user selected is larger than the resonance pattern associated with menu options that the user did not choose. In other embodiments, haptic feedback application 232 could distinguish between menu levels by causing resonance surface 700 to resonate in a manner, such that one or more resonance patterns vibrate more, are taller, are larger, etc.

Figure 8:
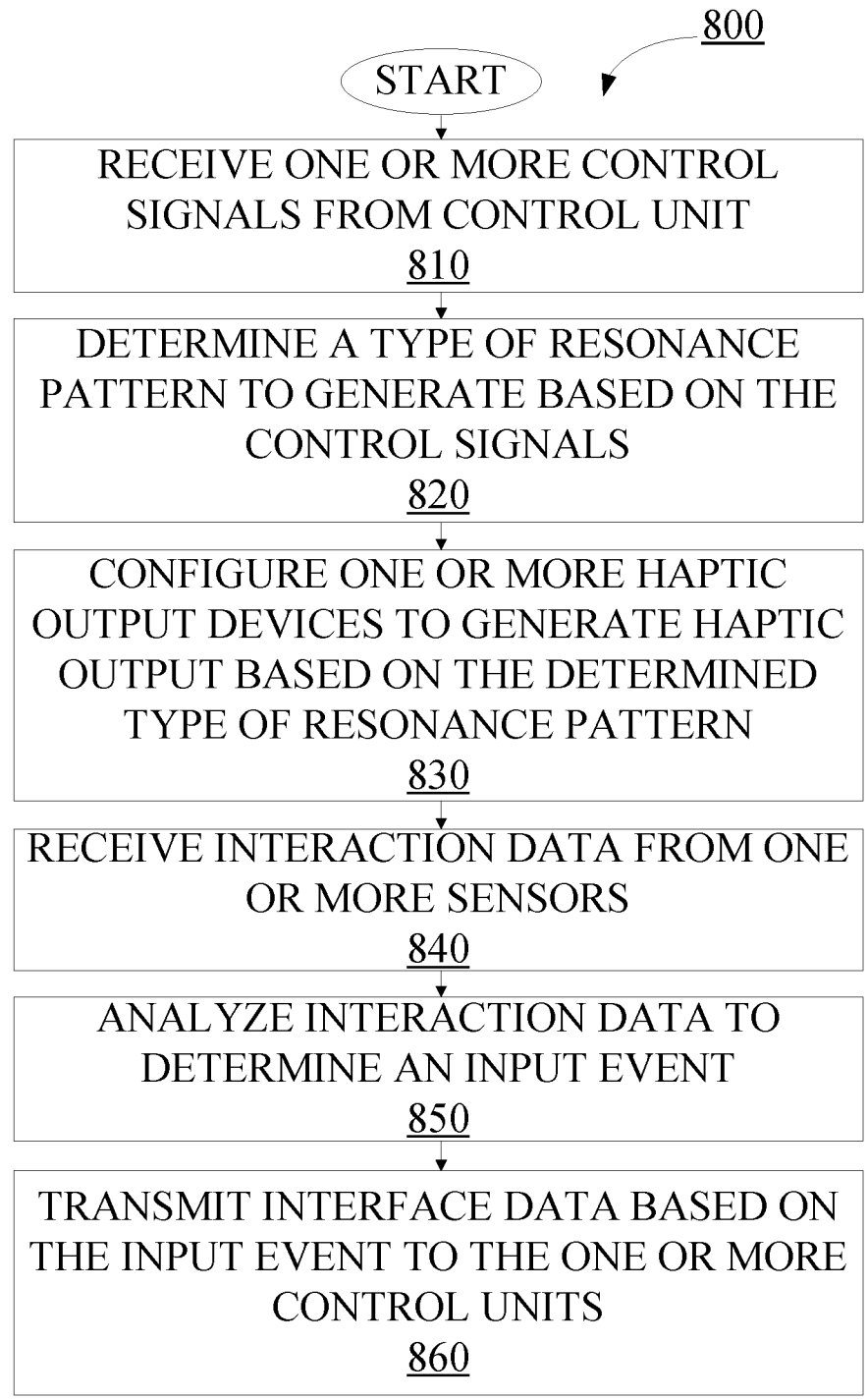
FIG. 8 illustrates a flow diagram of method steps for generating an interface on a resonance surface, according to various embodiments.

FIG. 8 illustrates a flow diagram of method steps for generating an interface on a resonance surface, according to various embodiments. Although the method steps are described in conjunction with the system of FIGS. 1-7 persons skilled in the art will understand that any system configured to perform the method steps, in any order, falls within the scope of the present disclosure.

As shown in FIG. 8, a method 800 begins at step 810, where haptic feedback application 232 receives one or more control signals from control units 160. As stated above, control unit 160 determines one or more interfaces to deliver to the user via resonance surface 170. In various embodiments, control unit 160 generates control signals that indicate a type of interface to generate on resonance surface 170 and transmits those control signals to haptic feedback application 232. Then, at step 820, haptic feedback application 232 determines a type of resonance pattern 175 to generate on resonance surface 170 based on the type of interface indicated by the control signals. At step 830, haptic feedback application 232 generates control signals to configure haptic output devices 150 to generate haptic output 155 based on the determined type of resonance pattern.

In some embodiments, at step 820, haptic feedback application 232 accesses database 234 to determine one or more parameters of haptic output devices 150 and resonance surface 170. Parameters of haptic output devices 150 include a type, a location, an orientation, a frequency range, and an intensity range. Parameters of resonance surface 170 include a type, a location, and a frequency response.

Once haptic output devices 150 generate haptic output 155, haptic output 155 causes resonance surface 170 to resonate, thereby generating resonance pattern 175 on resonance surface 170. Resonance pattern 175 simulates the interface indicated by control signals from control units 160. In embodiments that do not include sensors 140, the method ends at step 820. In embodiments that include sensors 140, sensors 140 generate interaction data that indicates the location of the user's hand with respect to resonance surface 170. Sensors 140 transmit the interaction data to haptic feedback application 232.

At step 840, haptic feedback application 232 receives interaction data from one or more sensors 140. At step 850, haptic feedback application 232 analyzes interaction data to determine a type of input event. An input event may include various types of user interaction including a one or two finger touch, a one or two finger swipe, a gesture performed above a resonance surface 170, and so forth. Furthermore, haptic feedback application 232 may access a look-up table in database 234 to map the type and location of the user interaction to a particular input event.

At step 860, haptic feedback application 232 generates interface data based on the input event and transmits the interface data to control units 160.

In sum, the haptic feedback application receives control signals from a control unit to generate an interface on a resonance surface. The haptic feedback application configures one or more haptic output devices to generate haptic output that is directed toward a resonance surface. The haptic output causes the resonance surface to resonate, thereby generating a resonance pattern on the resonance surface. The resonance pattern simulates the interface described by the control signals from the control unit. In some embodiments, one or more sensors generate interaction data that is indicative of a user interaction with the resonance surface. The haptic feedback application analyzes the interaction data to determine a type of input event that corresponds with the type of interface generated and the user interaction. The haptic feedback application generates interface data, based on the input event, and transmits the interface data to the control unit.

At least one advantage of the techniques described herein is that a user can interact with an interface without the user looking at the interface. Accordingly, the user (e.g., the driver) is able to interact with an interface and select options in a menu without diverting his or her gaze from the road. Utilizing resonance surfaces opens an alternative communications pathway to visual and aural communication, which are increasingly overused in today's complex in-vehicle computing environment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access surface memory (RAM), a read-only surface memory (ROM), an erasable programmable read-only surface memory (EPROM or Flash surface memory), an optical fiber, a portable compact disc read-only surface memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A system for generating an interface on a resonance surface, the system comprising:
    a memory storing one or more instructions; and
    a processor configured to execute the one or more instructions to:
        determine a first resonance pattern corresponding to a set of interface elements, wherein the first resonance pattern is associated with a first size,
        generate the first resonance pattern on the resonance surface by configuring a first haptic output device to generate a first haptic output at a location on the resonance surface and configuring a second haptic output device to generate a second haptic output that interferes constructively or destructively with the first haptic output at the location, wherein the location on the resonance surface resonates according to the first resonance pattern, and
        configure the first haptic output device to cease generating the first haptic output and the second haptic output device to cease generating the second haptic output, wherein the location on the resonance surface continues to resonate according to the first resonance pattern after the first haptic output device ceases to generate the first haptic output and the second haptic output device ceases to generate the second haptic output.

2. The system of claim 1, wherein the processor is further configured to:
    receive interaction data corresponding to an interaction with the first resonance pattern created on the resonance surface, and
    analyze the interaction data to determine an input event associated with at least one interface element included in the set of interface elements.

3. The system of claim 2, wherein:
    the processor is further configured to execute the one or more instructions to receive interface data from one or more control units,
    the interface data indicates a type of user interface to simulate on the resonance surface, and
    the set of interface elements corresponds to the type of user interface.

4. The system of claim 2, wherein the processor is further configured to execute the one or more instructions to select a location on the resonance surface at which to create the first resonance pattern.

5. The system of claim 1, wherein the processor is further configured to:
    configure at least one of the first haptic output device or the second haptic output device to exert a shear force on the resonance surface,
    wherein, in response to the shear force, the resonance surface resonates to generate the first resonance pattern.

6. The system of claim 5, wherein the first resonance pattern comprises a change in at least one of a shape of the resonance surface or a texture of the resonance surface.

7. The system of claim 1, wherein the resonance surface comprises a composite surface, and wherein the composite surface includes a resonance material and a non-resonance material.

8. The system of claim 7,
    wherein the first haptic output and the second haptic output resonate the resonance material included in the composite surface,
    wherein resonating the resonance material generates the first resonance pattern on the resonance material in the composite surface, and
    wherein the first resonance pattern on the resonance material in the composite surface generates a global resonance pattern on the composite surface.

9. The system of claim 1, wherein the first haptic output device and the second haptic output device comprise ultrasonic transducer devices.

10. An input/output (I/O) device for generating an interface on a resonance surface, the I/O device comprising:
    a first haptic output device and a second haptic output device configured to:
        determine a first resonance pattern corresponding to a set of interface elements, wherein the first resonance pattern is associated with a first size,
        generate the first resonance pattern on the resonance surface by generating a first haptic output at a location on the resonance surface and a second haptic output that interferes constructively or destructively with the first haptic output at the location, wherein the location on the resonance surface resonates according to the first resonance pattern, and cease generating the first haptic output and the second haptic output, wherein the location on the resonance surface continues to resonate according to the first resonance pattern after ceasing to generate the first haptic output and the second haptic output.

11. The I/O device of claim 10, wherein the first haptic output device and the second haptic output device comprise ultrasonic transducer devices.

12. The I/O device of claim 10, wherein:
the first haptic output device and the second haptic output device are configured to receive data from one or more control units,
the data indicates a type of user interface to simulate on the resonance surface, and
the set of interface elements corresponds to the type of user interface.

13. The I/O device of claim 10, wherein the first haptic output device and the second haptic output device are further configured to generate a haptic output hotspot on the resonance surface at which to create the first resonance pattern.

14. The I/O device of claim 10, wherein the first haptic output device and the second haptic output device are further configured to generate a second resonance pattern on the resonance surface, and wherein the second resonance pattern is different from the first resonance pattern in one or more of a shape, a size, a texture, or a density.

15. The I/O device of claim 14, wherein the second resonance pattern is generated in response to an interaction with the first resonance pattern.

16. A method for generating an interface on a resonance surface, the method comprising:

determining a first resonance pattern corresponding to a set of interface elements, wherein the first resonance pattern is associated with a first size;

generating the first resonance pattern on the resonance surface by configuring a first haptic output device to generate a first haptic output at a location on the resonance surface and configuring a second haptic output device to generate a second haptic output that interferes constructively or destructively with the first haptic output at the location, wherein the location on the resonance surface resonates according to the first resonance pattern, and configuring the first haptic output device to cease generating the first haptic output and the second haptic output device to cease generating the second haptic output, wherein the location on the resonance surface continues to resonate according to the first resonance pattern after the first haptic output device ceases to generate the first haptic output and the second haptic output device ceases to generate the second haptic output.

17. The method of claim 16, further comprising:
receiving interaction data corresponding to an interaction with the first resonance pattern created on the resonance surface,
analyzing the interaction data to determine an input event associated with at least one interface element included in the set of interface elements, and
generating, based on the input event, a second resonance pattern on the resonance surface.

18. The method of claim 17, wherein the first resonance pattern comprises a change in at least one of a shape of the resonance surface or a texture of the resonance surface.

* * * * *